US009696548B2

(12) United States Patent
Ohashi

(10) Patent No.: US 9,696,548 B2
(45) Date of Patent: Jul. 4, 2017

(54) STEREOSCOPIC VIDEO OBSERVATION DEVICE AND TRANSMITTANCE CONTROL METHOD

(71) Applicant: SONY COMPUTER ENTERTAINMENT INC., Tokyo (JP)

(72) Inventor: Yoshinori Ohashi, Tokyo (JP)

(73) Assignees: SONY CORPORATION, Tokyo (JP); SONY INTERACTIVE ENTERTAINMENT INC., Tokyo (JP)

( * ) Notice: Subject to any disclaimer, the term of this patent is extended or adjusted under 35 U.S.C. 154(b) by 191 days.

(21) Appl. No.: 14/406,632

(22) PCT Filed: Apr. 18, 2013

(86) PCT No.: PCT/JP2013/002624
§ 371 (c)(1),
(2) Date: Dec. 9, 2014

(87) PCT Pub. No.: WO2014/002348
PCT Pub. Date: Jan. 3, 2014

(65) Prior Publication Data
US 2015/0130911 A1    May 14, 2015

(30) Foreign Application Priority Data

Jun. 29, 2012 (JP) ................................. 2012-147345

(51) Int. Cl.
*G02B 27/01* (2006.01)
*H04N 5/64* (2006.01)
(Continued)

(52) U.S. Cl.
CPC ....... *G02B 27/017* (2013.01); *G02B 27/2228* (2013.01); *H04N 5/64* (2013.01);
(Continued)

(58) Field of Classification Search
CPC .... G02B 2027/0118; G02B 2027/0134; G02B 2027/0178; G02B 27/017; G02B 27/2228;
(Continued)

(56) References Cited

U.S. PATENT DOCUMENTS 5,880,883 A * 3/1999 Sudo ...................... G02B 27/22
345/7
6,084,557 A * 7/2000 Ishida .................. G02B 27/017
345/7
(Continued)

FOREIGN PATENT DOCUMENTS

CN       1692304      11/2005
CN       1754392       3/2006
(Continued)

OTHER PUBLICATIONS

Chinese First Office Action dated Jan. 5, 2016 from corresponding Application No. 201380032988.3.
(Continued)

*Primary Examiner* — Shan Elahi
(74) *Attorney, Agent, or Firm* — Katten Muchin Rosenman LLP

(57) ABSTRACT

In a stereoscopic video observation device 200, an optically transmissive HMD 208 presents video observed when a three-dimensional image in a virtual three-dimensional space is projected into a real space. A transmittance changing section changes the transmittance of light that passes through the optically transmissive HMD 208. A shutter control section 220 sets a lower limit value of the light transmittance that can be changed by the transmittance changing section.

9 Claims, 7 Drawing Sheets

(51) Int. Cl.
*H04N 21/41* (2011.01)
*H04N 21/431* (2011.01)
*H04N 21/81* (2011.01)
*H04N 13/04* (2006.01)
*G02B 27/22* (2006.01)
*G09G 3/00* (2006.01)

(52) U.S. Cl.
CPC ....... *H04N 13/044* (2013.01); *H04N 13/0438* (2013.01); *H04N 13/0468* (2013.01); *H04N 13/0497* (2013.01); *H04N 21/4122* (2013.01); *H04N 21/4318* (2013.01); *H04N 21/816* (2013.01); *G02B 2027/0118* (2013.01); *G02B 2027/0134* (2013.01); *G02B 2027/0178* (2013.01); *G09G 3/003* (2013.01); *H04N 2213/008* (2013.01)

(58) Field of Classification Search
CPC .. G09G 3/003; H04N 13/0438; H04N 13/044; H04N 13/0468; H04N 13/0497; H04N 21/4122; H04N 21/4318; H04N 21/816; H04N 2213/008; H04N 5/64
USPC .......................................................... 348/53
See application file for complete search history.

(56) References Cited

U.S. PATENT DOCUMENTS

| | | | | | |
|---|---|---|---|---|---|
| 6,088,006 | A | * | 7/2000 | Tabata | H04N 13/0275 345/7 |
| 6,111,597 | A | * | 8/2000 | Tabata | G02B 27/2264 345/8 |
| 8,370,873 | B2 | * | 2/2013 | Shintani | H04N 13/0438 348/42 |
| 8,427,746 | B2 | * | 4/2013 | Si | H04N 13/0418 345/4 |
| 8,854,434 | B2 | * | 10/2014 | Saito | G09G 3/003 348/42 |
| 9,030,538 | B2 | | 5/2015 | Jung | |
| 2004/0012762 | A1 | * | 1/2004 | Faris | A61F 9/065 353/122 |
| 2005/0013002 | A1 | * | 1/2005 | Faris | A61F 9/065 359/613 |
| 2008/0218434 | A1 | | 9/2008 | Kelly et al. | |
| 2010/0271587 | A1 | * | 10/2010 | Pavlopoulos | G02B 27/0172 351/158 |
| 2011/0221925 | A1 | * | 9/2011 | Tajiri | G03B 9/08 348/222.1 |
| 2011/0240834 | A1 | * | 10/2011 | Baudou | G02B 27/01 250/214 AL |
| 2012/0068913 | A1 | * | 3/2012 | Bar-Zeev | G02B 26/026 345/8 |
| 2013/0128019 | A1 | * | 5/2013 | Tajima | G02B 27/2214 348/59 |
| 2014/0049633 | A1 | * | 2/2014 | Pretorius | G02B 21/0012 348/79 |
| 2015/0205484 | A1 | * | 7/2015 | Morishita | G06F 3/012 382/103 |

FOREIGN PATENT DOCUMENTS

| | | |
|---|---|---|
| CN | 102271267 | 12/2011 |
| CN | 102279472 | 12/2011 |
| CN | 202190358 | 4/2012 |
| JP | 6-78247 | 3/1994 |
| JP | 10-221637 A | 8/1998 |
| JP | 2004-341027 | 12/2004 |
| JP | 2005-172851 | 6/2005 |
| JP | 2007-079297 | 3/2007 |
| JP | 2007-264324 | 10/2007 |
| JP | 2008-9007 A | 1/2008 |
| JP | 2008-185609 | 8/2008 |
| JP | 2010-050645 | 3/2010 |
| JP | 2010-521347 | 6/2010 |
| JP | 2012-088472 | 5/2012 |
| KR | 10-2012-0039087 | 4/2012 |
| KR | 20120039087 A | 4/2012 |
| WO | 2008/109231 | 9/2008 |

OTHER PUBLICATIONS

European Search Report dated Jan. 14, 2016 from corresponding Application No. 13809468.5.
Korean Notice of Preliminary Rejection dated Jan. 8, 2016 from corresponding Application No. 10-2014-7035486.
Japanese Notification of Reasons for Refusal dated Jan. 26, 2016 from corresponding Application No. 2013-171962.
International Preliminary Report on Patentability and Written Opinion of the International Searching Authority dated Jan. 8, 2015 from corresponding Application No. PCT/JP2013/002624.
Russian Federation Official Action dated May 4, 2016 from corresponding Application No. 2015102843/28(004371).
Japanese Notification of Reason for Refusal dated Jul. 12, 2016 from corresponding Application No. 2013-171962.
International Search Report dated Jul. 30, 2013, from the corresponding PCT/JP2013/002624.
Decision of Dismissal of Amendment dated Nov. 8, 2016, from the corresponding Japanese Application No. 2013-171962.
Decision of Refusal dated Nov. 8, 2016, from the corresponding Japanese Application No. 2013-171962.
Chinese Office Action dated Aug. 16, 2016, from the corresponding Chinese Patent Application No. 2013800329883.

* cited by examiner

FIG. 4
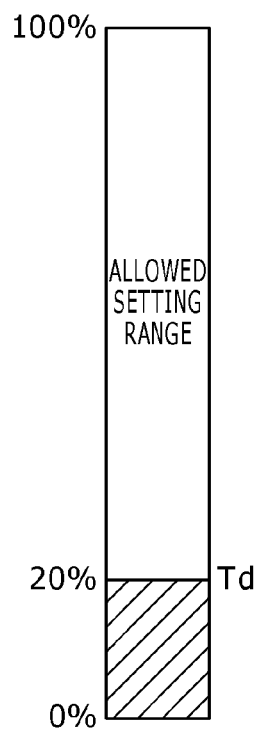
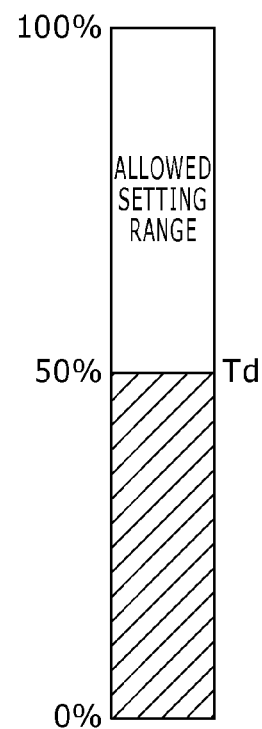
(a)                    (b)
FIG. 5
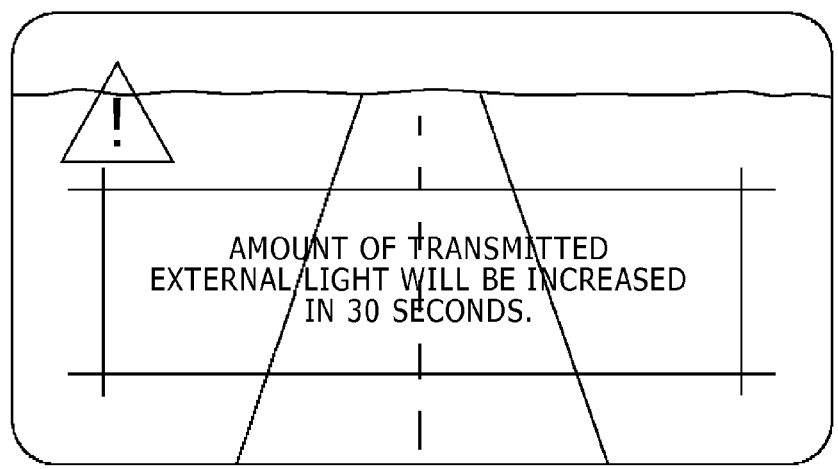

STEREOSCOPIC VIDEO OBSERVATION DEVICE AND TRANSMITTANCE CONTROL METHOD

TECHNICAL FIELD

The present invention relates to a stereoscopic video observation device and a transmittance control method performed in the stereoscopic video observation device.

BACKGROUND ART

Recently, the development of a technology for presenting stereoscopic video has made progress, and head mount displays (Head Mounted Display; hereinafter described as an "HMD") capable of presenting stereoscopic video having a depth have spread. Such HMDs include an optically transmissive HMD that has been developed which enables a user to view a state of the outside of the HMD in a see-through manner while presenting stereoscopic video to the user using a holographic element, a half-silvered mirror, and the like.

In addition, the performance of television monitors has been improved, and three-dimensional monitors capable of presenting stereoscopic video having a depth have spread. Unlike monitors that display conventional two-dimensional video, the video presented by a three-dimensional monitor is a stereoscopic video having a depth in a frontward-rearward direction. There are various systems as technologies for realizing such a three-dimensional monitor. An example thereof is a three-dimensional monitor of a frame sequential system that displays a parallax image for a left eye and a parallax image for a right eye alternately on a time-division basis. A user can observe stereoscopic video by observing the video through shutter eyeglasses having shutters opened and closed in synchronism with the display of the three-dimensional monitor of the frame sequential system.

The inventor of the present application has come to realize a possibility of providing an optically transmissive HMD with optical shutters for observing a three-dimensional monitor of the frame sequential system, and thereby presenting stereoscopic video by both of the three-dimensional monitor and the HMD. The inventor of the present application has also come to realize a possibility of adjusting an amount of external light incident on the optically transmissive HMD by using the optical shutters even when the three-dimensional monitor is not observed, and thus improving the visibility of video on the HMD.

SUMMARY

Technical Problem

In a case where the amount of external light incident on the optically transmissive HMD is adjusted by using the optical shutters, when the external light is unexpectedly shut off in a state in which the user is viewing the state of the outside of the HMD in a see-through manner, the user suddenly becomes unable to view the state of the outside world, so that the user may be annoyed.

The present invention has been made in view of such problems, and it is an object of the present invention to provide a technology for improving the usability of an optically transmissive HMD capable of changing the transmittance of light.

Solution to Problem

In order to solve the above problems, a mode of the present invention is a stereoscopic video observation device. The stereoscopic video observation device includes: an optically transmissive HMD configured to present video observed when a three-dimensional image in a virtual three-dimensional space is projected into a real space; a transmittance changing section configured to change transmittance of light passing through the optically transmissive HMD; and a shutter control section configured to set a lower limit value of the light transmittance that can be changed by the transmittance changing section.

Another mode of the present invention is a transmittance control method. This method makes a processor perform: a step of obtaining a change in position coordinates of an optically transmissive HMD for presenting video observed when a three-dimensional image in a virtual three-dimensional space is projected into a real space; and a step of setting a lower limit value of transmittance of light passing through the optically transmissive HMD by controlling a transmittance changing section provided to the optically transmissive HMD on a basis of the obtained change in the position coordinates.

Yet another mode of the present invention is a program for making a computer realize the steps of the above method.

The program may be provided as a part of firmware incorporated into an apparatus in order to perform basic control of hardware resources such as a video and audio decoder and the like. The firmware is for example stored in a semiconductor memory such as a ROM (Read Only Memory) within the apparatus, a flash memory, or the like. In order to provide the firmware or update a part of the firmware, a computer readable recording medium on which the program is recorded may be provided, or the program may be transmitted by a communication line.

It is to be noted that arbitrary combinations of the above constituent elements as well as modes realized by converting expressions of the present invention between a method, a device, a system, a computer program, a data structure, a recording medium, and the like are also effective as modes of the present invention.

Advantageous Effects of Invention

According to the present invention, a technology can be provided which improves the usability of an optically transmissive HMD capable of changing the transmittance of light.

BRIEF DESCRIPTION OF DRAWINGS

FIGS. 4(a) and 4(b) are diagrams showing relation between the lower limit value of transmittance and the allowed setting range of the transmittance.

FIG. 5 is a diagram showing an example of a message generated by a notifying information generating section according to the embodiment.

DESCRIPTION OF EMBODIMENT

Figure 1:
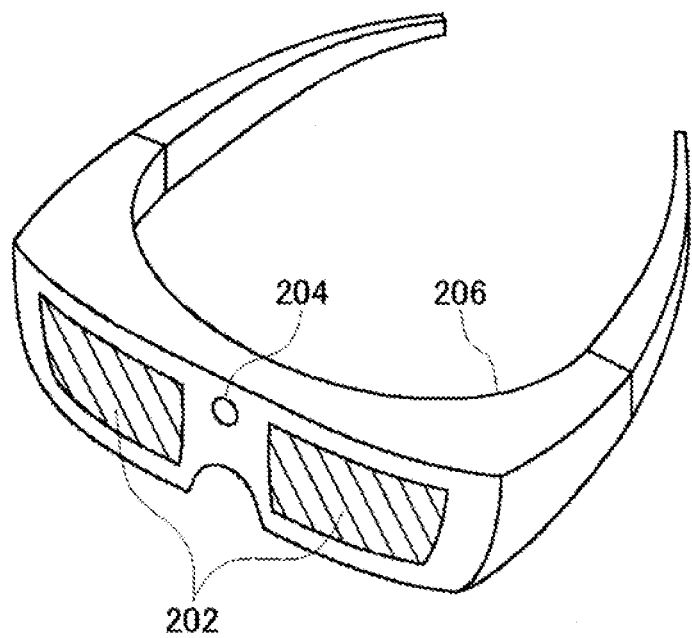
FIG. 1 is a diagram schematically showing an example of an external appearance of a stereoscopic video observation device according to an embodiment.

FIG. 1 is a diagram schematically showing an example of an external appearance of a stereoscopic video observation device 200 according to an embodiment. The stereoscopic video observation device 200 includes a presenting block 202 for presenting stereoscopic video, a first imaging element 204, and a casing 206 housing various modules. Incidentally, though not shown, the stereoscopic video observation device 200 has earphones for outputting audio.

The presenting block 202 includes an optically transmissive HMD for presenting stereoscopic video to the eyes of a user and a transmittance changing section configured to change the transmittance of external light passing through the optically transmissive HMD. The transmittance changing section also functions as a shutter by changing the transmittance of the light to 0% and 100%. The transmittance changing section can be realized for example by using a known technology such as a liquid crystal shutter, an ECD (electrochromic display), or the like. The first imaging element 204 images a subject in a region including the field of vision of the user wearing the stereoscopic video observation device 200. The first imaging element 204 is therefore installed so as to be disposed around the middle of the forehead of the user when the user wears the stereoscopic video observation device 200. The first imaging element 204 can be realized for example by using a known solid-state imaging element such as a CCD (Charge Coupled Device) image sensor, a CMOS (Complementary Metal Oxide Semiconductor) image sensor, or the like.

The casing 206 plays a role of a frame in the stereoscopic video observation device 200 having the shape of eyeglasses, and houses various modules (not shown) used by the stereoscopic video observation device 200. The modules used by the stereoscopic video observation device 200 are an optical engine including a hologram light guide plate for realizing the optically transmissive HMD, a driver for driving the transmittance changing section and a synchronizing signal receiving section, as well as a communication module such as a Wi-Fi (registered trademark) module or the like, an electronic compass, an acceleration sensor, an inclination sensor, a GPS (Global Positioning System) sensor, a 3G (3rd. Generation) module, an illuminance sensor, and the like. These modules are illustrative, and the stereoscopic video observation device 200 does not necessarily need to include all of these modules. Modules to be included may be determined according to a usage scene assumed by the stereoscopic video observation device 200.

FIG. 1 is a diagram illustrating the stereoscopic video observation device 200 of the eyeglasses type. There are various other variations conceivable as the shape of the stereoscopic video observation device 200, such as a cap shape, a belt shape fixed around a head portion of the user, a helmet shape covering the whole of the head portion of the user, and the like. It should be readily understood by those skilled in the art that stereoscopic video observation devices 200 of any of the shapes are included in embodiment of the present invention.

Figure 2:
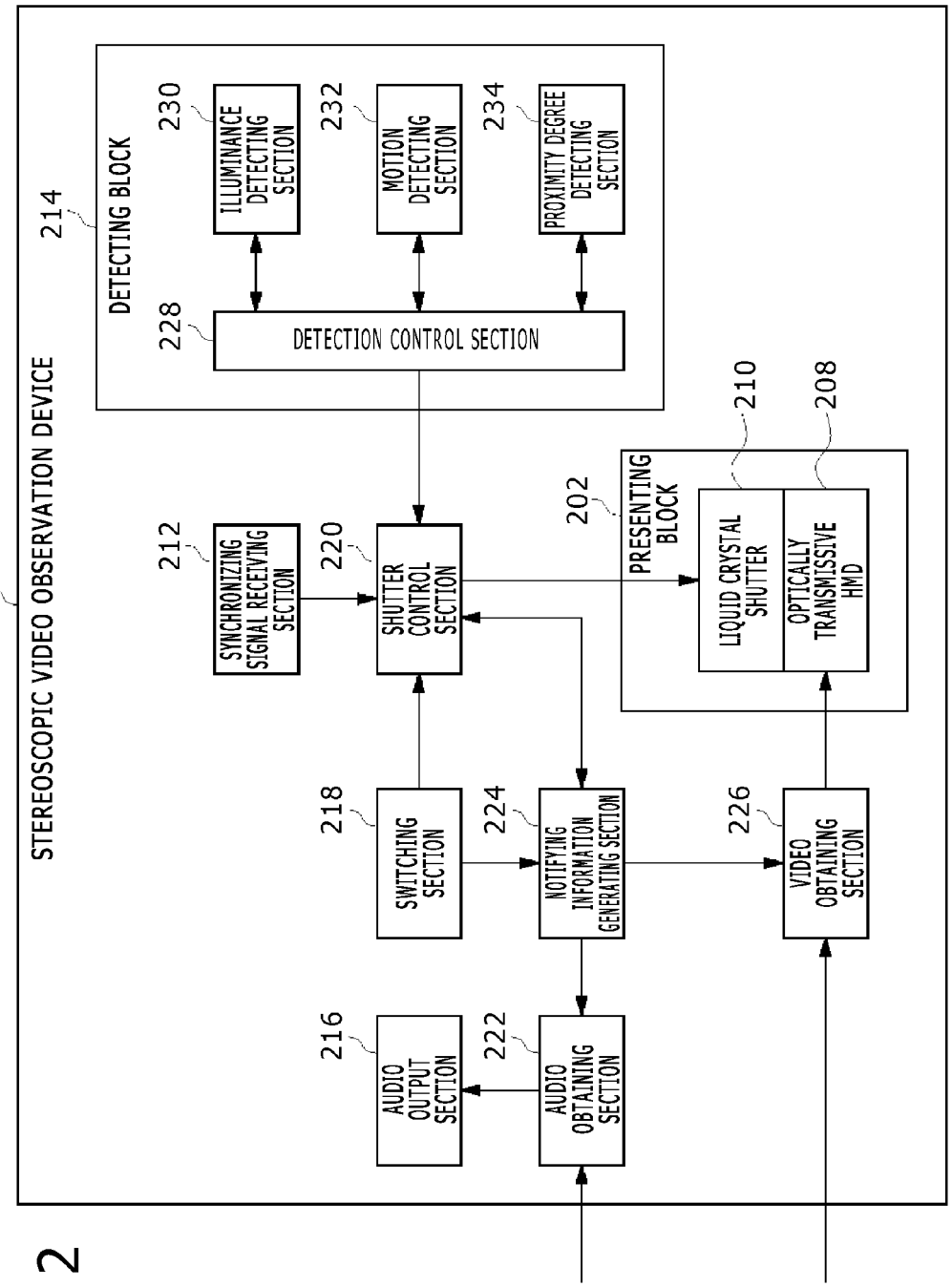
FIG. 2 is a diagram schematically showing a general constitution of a video presenting system according to the embodiment.

FIG. 2 is a diagram schematically showing a general constitution of a video presenting system 100 according to the embodiment. The video presenting system 100 according to the embodiment includes the stereoscopic video observation device 200, a three-dimensional monitor 300, a second imaging element 302, and an information processing device 400.

The three-dimensional monitor 300 displays stereoscopic video by the frame sequential system. The left and right eyes of a human are separated from each other by about 6 cm. A parallax thus occurs between the image seen from the left eye and the image seen from the right eye. The brain of a human is said to use parallax images perceived by the left and right eyes as one piece of information for recognizing a depth. Therefore, when the parallax image perceived by the left eye and the parallax image perceived by the right eye are projected into the respective eyes, the human recognizes the parallax images as video having a depth. The three-dimensional monitor 300 displays the parallax image for the left eye and the parallax image for the right eye alternately on a time-division basis. The three-dimensional monitor 300 can be realized by using a known presenting device such as a liquid crystal television set, a plasma display, an organic EL monitor, or the like.

As described above, the transmittance changing section is a device capable of changing the transmittance of light, and changes an amount of external light reaching the eyes of the user wearing the stereoscopic video observation device 200. In the present specification, description will hereinafter be made assuming that a liquid crystal shutter 210 is employed as the transmittance changing section. However, it is to be understood by those skilled in the art that the transmittance changing section is not limited to a liquid crystal shutter, but can be replaced by another technology as long as the transmittance of light can be changed.

The liquid crystal shutter 210 opens and closes a left shutter and a right shutter in synchronism with the changing of the parallax images by the three-dimensional monitor 300. More specifically, when the three-dimensional monitor 300 is displaying the parallax image for the left eye, the liquid crystal shutter 210 closes the shutter for the right eye and opens the shutter for the left eye to present the parallax image for the left eye to the user wearing the stereoscopic video observation device 200. Conversely, when the three-dimensional monitor 300 is displaying the parallax image for the right eye, the liquid crystal shutter 210 closes the shutter for the left eye and opens the shutter for the right eye to present the parallax image for the right eye to the user.

In order to realize this, a synchronizing signal receiving section 212 receives a synchronizing signal for shutter switching. The synchronizing signal is transmitted from a signal transmitting section not shown in the figures which signal transmitting section is provided in the three-dimensional monitor 300 or the information processing device 400 by radio for example using infrared light or the like. A shutter control section 220 controls the opening and closing of the liquid crystal shutter 210 according to the synchronizing signal received by the synchronizing signal receiving section 212.

As described above, the presenting block 202 includes the optically transmissive HMD 208 for presenting stereoscopic video to the eyes of the user and the liquid crystal shutter 210 for changing the transmittance of external light that passes through the optically transmissive HMD 208.

A video obtaining section 226 obtains a virtual three-dimensional image to be presented to the user wearing the stereoscopic video observation device 200. The video obtaining section 226 may obtain the video from the outside via the communication module not shown in the figures, or may obtain the video by generating the video using a three-dimensional rendering technology. Here, when the video obtaining section 226 for example obtains contents including the audio of a movie, a game, or the like, an audio obtaining section 222 obtains the audio. The audio obtained by the audio obtaining section 222 is reproduced by an audio output section 216. The audio output section 216 can be realized by using the earphones (not shown) provided to the stereoscopic video observation device 200 or the like.

Figure 3:
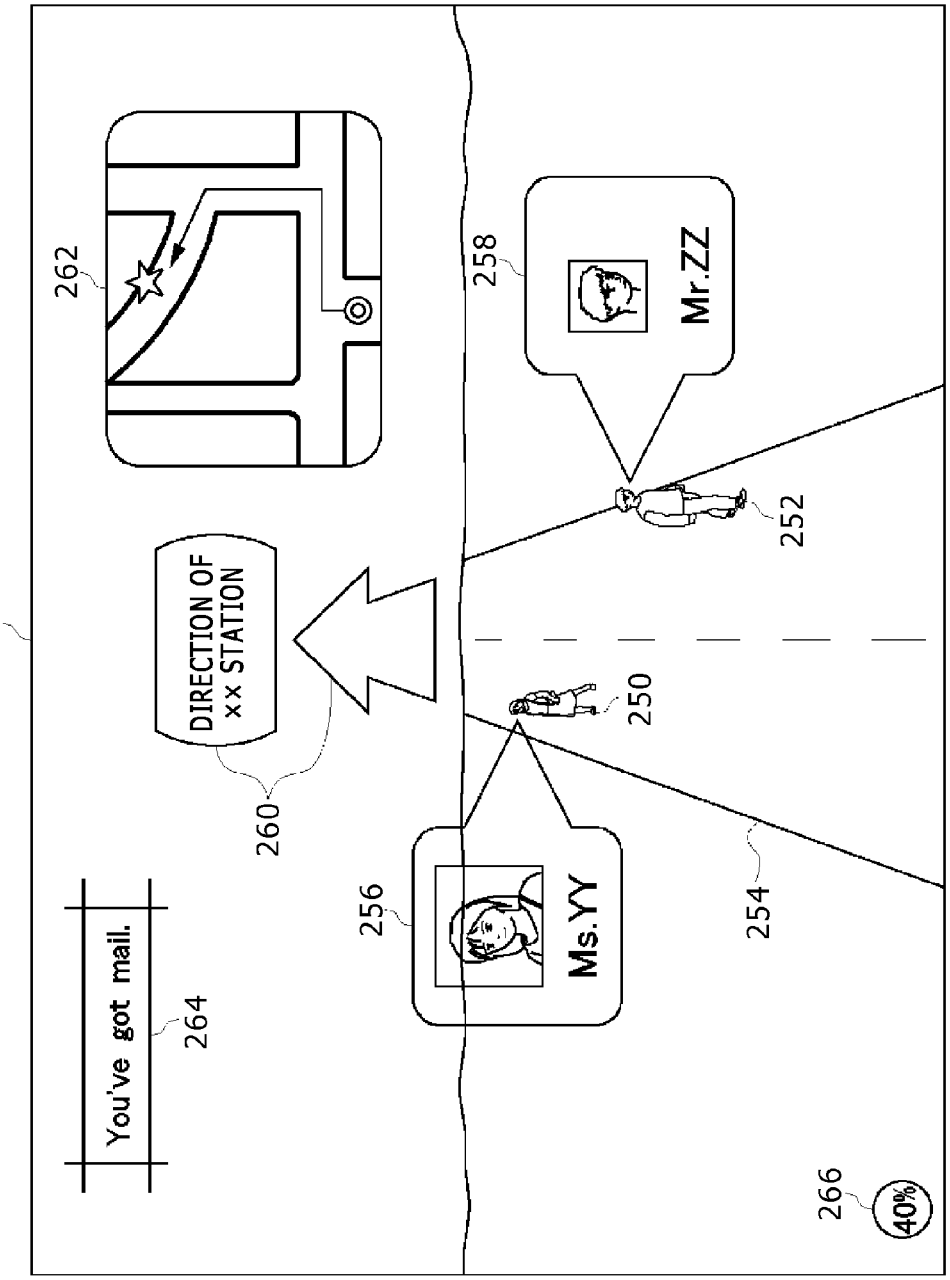
FIG. 3 is a diagram schematically showing a configuration of the stereoscopic video observation device according to the embodiment.

The optically transmissive HMD 208 presents video formed by projecting the three-dimensional image obtained by the video obtaining section 226 in a state of being superimposed in a real space to the user wearing the stereoscopic video observation device 200. FIG. 3 is a diagram showing an example of video presented to the presenting block 202 of the optically transmissive HMD 208 according to the embodiment. In the example shown in FIG. 3, a female person 250 and a male person 252 are actually present on an actually present road 254. The video of the female person 250 and the male person 252 imaged by the first imaging element 204 is analyzed by a person recognition engine not shown in the figures in the video obtaining section 226. When the persons are identified successfully, the video obtaining section 226 displays photographs of the faces of the persons and the names of the persons by superimposing balloon type videos 256 and 258 at the female person 250 and the male person 252, respectively. Incidentally, it suffices to realize the person recognition engine by using a known method such as a machine learning method or the like.

The video obtaining section 226 may obtain a position at which the user wearing the stereoscopic video observation device 200 is present and a traveling direction of the user wearing the stereoscopic video observation device 200 from the GPS sensor not shown in the figures, and display main facilities or the like in that direction. In the example shown in FIG. 3, a telop showing the name of a station present in the traveling direction of the user is displayed in a state of being superimposed on the video of the real space together with an indicator 260 in the shape of an arrow. In addition, a simplified map 262 showing a route from the present position of the user to a destination is displayed in a state of being superimposed on the video of the real space. In addition, an email reception telop 264 indicating that email is received from a mobile telephone communication network via the 3G module not shown in the figures and an indicator 266 indicating the present transmittance of external light (to be described later) are displayed.

As shown in FIG. 3, the presenting block 202 of the optically transmissive HMD 208 displays virtual video in a state of being superimposed on the video of the real space. Hence, the brightness of ambient light differs greatly between, for example, a case in which the stereoscopic video observation device 200 is used outdoors in the daytime and a case in which the stereoscopic video observation device 200 is used in the nighttime or inside a building. Thus, in order to improve the visibility of the virtual video displayed in a state of being superimposed on the video of the real space, the amount of external light that passes through the presenting block 202 is desirably adjusted according to a physical quantity such for example as the brightness of the ambient light or the like.

Accordingly, the liquid crystal shutter 210 changes the transmittance of the external light that passes through the optically transmissive HMD 208 under control of the shutter control section 220. Here, the "transmittance" is a ratio of the light that passes through the liquid crystal shutter 210, and is a value that represents, as a percentage, an amount of light after passing through the liquid crystal shutter 210 when an amount of light before entering the liquid crystal shutter 210 is expressed as 100.

Here, when the video presented to the presenting block 202 of the optically transmissive HMD 208 is video not including the video of the outside world, such for example as the video of a movie, the lower the transmittance is, that is, the less easily the external light is allowed to pass through, the higher the visibility of the video becomes. On the other hand, unlike a case where an ordinary stationary type television monitor is used, the stereoscopic video observation device 200 is used in a mode of being mounted on the head portion of the user, so that the user can move around freely while observing the video. Hence, a setting that does not allow the external light to pass through at all makes it difficult for the user to move around freely, and thus impairs usability. Accordingly, the shutter control section 220 also sets a lower limit value of the transmittance of the light which transmittance can be changed by the liquid crystal shutter 210. Here, the "lower limit value of the transmittance" which lower limit value is set by the shutter control section 220 is a lower limit value of a setting range of the transmittance allowed to the liquid crystal shutter 210.

FIGS. 4(a) and 4(b) are diagrams showing relation between the lower limit value of the transmittance and the allowed setting range of the transmittance. FIG. 4(a) is a diagram showing the allowed setting range of the transmittance in a case where the lower limit value of the transmittance is 20%. FIG. 4(b) is a diagram showing the allowed setting range of the transmittance in a case where the lower limit value of the transmittance is 50%.

As shown in FIG. 4(a), when the shutter control section 220 sets the lower limit value of the transmittance at 20%, the liquid crystal shutter 210 can change the transmittance in a range of 20% to 100%, but a setting less than 20% as the lower limit value of the transmittance is prohibited. In FIG. 4(a), a range in which the setting of the transmittance is prohibited is hatched. When the lower limit value of the transmittance is set at 20%, at least 20% of the external light passes through the liquid crystal shutter 210 and reaches the presenting block 202, so that a non-transmitted state of the external light is prevented. Because the shutter control section 220 thus sets the lower limit value of the transmittance, it is possible to control a balance between the visibility of the video presented to the presenting block 202 and an improvement in usability due to the provision of the video of the outside world. In the present specification, the "lower limit value of the transmittance" may hereinafter be described as a "lower limit transmittance $T_d$."

The description returns to FIG. 2. The shutter control section 220 sets the lower limit value of the transmittance on the basis of physical quantities detected by a detecting block 214. For this purpose, the detecting block 214 includes an illuminance detecting section 230, a motion detecting section 232, a proximity degree detecting section 234, and a detection control section 228 that controls these detecting sections in a centralized manner.

The illuminance detecting section 230 detects illuminance around the stereoscopic video observation device 200. The shutter control section 220 changes the lower limit value of the transmittance of the light on the basis of the illuminance detected by the illuminance detecting section 230. Specifically, in a case where the illuminance obtained by the illuminance detecting section 230 is high, the shutter control section 220 sets the lower limit value of the transmittance lower than in a case where the illuminance obtained by the illuminance detecting section 230 is low. In the example shown in FIG. 4, FIG. 4(a) shows the allowed setting range of the transmittance in a case of a high illuminance, and FIG. 4(b) shows the allowed setting range of the transmittance in a case of a low illuminance. Thus, for example, when the user uses the stereoscopic video observation device 200 outdoors in the daytime, the setting of a low transmittance is allowed. This is because a high brightness of the outdoor ambient light in the daytime enables the user to observe the state of the outside world sufficiently even when the transmittance is set low. Conversely, in the nighttime or inside a building, the brightness of the ambient light is low, and thus an amount of external light that reaches the eyes of the user is ensured by setting the lower limit value of the transmittance high.

As described above, the stereoscopic video observation device 200 is used in a mode of being mounted on the head portion of the user, so that the user can move around freely. When the user uses the stereoscopic video observation device 200 while moving, the surrounding environment changes at all times. Therefore the user can desirably observe the state of the outside world. On the other hand, when viewing contents such as a movie or the like in a stationary state within a house or the like, the user may desire to shut off the video of the outside world completely. The range of the settable transmittance is desirably thus changed according to the moving state of the stereoscopic video observation device 200.

Accordingly, the motion detecting section 232 obtains information on a change in the position coordinates of the stereoscopic video observation device 200, such as the speed and acceleration of the stereoscopic video observation device 200 or the like. The shutter control section 220 changes the lower limit value of the light transmittance that can be changed by the liquid crystal shutter 210 on the basis of the change in the position coordinates which change is obtained by the motion detecting section 232. More specifically, in a case where the change in the position coordinates which change is obtained by the motion detecting section 232 is small, the shutter control section 220 sets the lower limit value of the light transmittance that can be changed by the liquid crystal shutter 210 lower than in a case of a high rate of change in the position coordinates. In the example shown in FIG. 4, FIG. 4(a) shows the allowed setting range of the transmittance in a case of a small change in the position coordinates, and FIG. 4(b) shows the allowed setting range of the transmittance in a case of a large change in the position coordinates.

Thereby, a state in which the user can check the state of the outside world can be maintained when the user is moving at a high speed or accelerating greatly, for example. Incidentally, the shutter control section 220 may simultaneously perform control for setting the lower limit value of the transmittance on the basis of the illuminance detected by the illuminance detecting section 230 and control for setting the lower limit value of the transmittance on the basis of the change in the position coordinates which change is detected by the motion detecting section 232. For example, even in cases where the user is moving at a same speed, when the illuminance of the ambient light is high at that time, the shutter control section 220 sets the lower limit value of the transmittance lower than when the illuminance of the ambient light is low. This can realize a setting of the lower limit value of the transmittance in which setting consideration is given to both of the illuminance of the ambient light and the moving speed of the user.

In addition, the shutter control section 220 may set an order of priority to the physical quantities used for the control for setting the lower limit value of the transmittance. For example, the shutter control section 220 gives a higher priority to information on the moving speed of the user than to information on the illuminance of the ambient light, and sets the lower limit value of the transmittance. Specifically, even in a case of a low illuminance of the ambient light, when the user is standing still, the shutter control section 220 sets the lower limit value of the transmittance to 0%. This for example enables the user to enjoy contents such as a movie and the like with lighting dimmed and external light shut off within a house.

The proximity degree detecting section 234 within the detecting block 214 measures a distance between the stereoscopic video observation device 200 and an object or a person around the stereoscopic video observation device 200. When the distance to the thing around the stereoscopic video observation device 200 which distance is measured by the proximity degree detecting section 234 becomes equal to or less than a predetermined distance, the shutter control section 220 raises the lower limit value of the transmittance. Here, the "predetermined distance" is a reference distance for the shutter control section 220 to determine whether or not to forcibly raise the lower limit value of the transmittance. The predetermined distance may be determined by experiment according to an assumed usage scene of the stereoscopic video observation device 200. The predetermined distance is for example two meters. Thereby, for example, the user concentrating on the contents reproduced by the stereoscopic video observation device 200 can be made to notice an object coming closer. Accordingly, the "predetermined distance" may be changed according to the change in the position coordinates which change is detected by the motion detecting section 232. Specifically, in a case of a fast moving speed of the user, the "predetermined distance" may be set at a longer distance than in a case of a slow moving speed of the user.

As described above, the shutter control section 220 automatically sets the lower limit value of the transmittance on the basis of the physical quantities detected by the detecting block 214. Therefore, the lower limit value of the transmittance can be changed greatly while the change is not intended by the user using the stereoscopic video observation device 200. As a result, the transmittance actually set in the liquid crystal shutter 210 can also be changed greatly. For example, when the transmittance set in the liquid crystal shutter 210 is changed from 20% to 60%, an amount of light that reaches the eyes of the user increases threefold, which may cause a feeling of strangeness to the user. Conversely, when the transmittance set in the liquid crystal shutter 210 is changed from 60% to 20%, the visibility of the outside world may be decreased.

Accordingly, when the shutter control section changes the changeable light transmittance allowed to the liquid crystal shutter 210 by a predetermined amount or more, a notifying information generating section 224 generates a message to the effect that the transmittance will be changed before the setting of the transmittance is actually changed, and makes the optically transmissive HMD 208 present the message. Here, the "predetermined amount of the transmittance" is a reference change amount of the transmittance which reference change amount is used for the notifying information generating section 224 to determine whether or not to generate the message to be noticed by the user. It suffices to determine the "predetermined amount of the transmittance" by experiment in consideration of assumed usage scenes of the stereoscopic video observation device 200.

FIG. 5 is a diagram showing an example of the message generated by the notifying information generating section 224 according to the embodiment. As shown in FIG. 5, in order to make the user notice easily, information is displayed in a state of being superimposed on a view actually observed by the user. This allows the user to be prepared for the change in the transmittance, and can therefore reduce a sense of unexpectedness caused to the user. Incidentally, as the message indicating that the transmittance will be changed, the notifying information generating section 224 may generate audio information in place of the video presented by the optically transmissive HMD 208 or in addition to the video. In this case, the audio generated by the notifying information generating section 224 is reproduced by the audio output section 216 via the audio obtaining section 222.

As described above, the shutter control section 220 automatically sets the lower limit value of the transmittance on the basis of the physical quantities detected by the detecting block 214. However, some users may desire to stop the control of the lower limit value of the transmittance by the shutter control section 220. For example, this may be true for a case where the stereoscopic video observation device 200 is used at the site of an attraction, an amusement center, or the like.

Accordingly, a switching section 218 make a setting as to whether or not to allow the shutter control section 220 to control the lower limit value of the light transmittance that can be changed by the liquid crystal shutter 210. When the switching section 218 prohibits the shutter control section 220 from controlling the lower limit value of the light transmittance that can be changed by the liquid crystal shutter 210, the stereoscopic video observation device 200 is allowed an external light transmittance of 0%, that is, a non-transmission state.

The switching section 218 can be realized by a hardware switch (not shown) provided to the stereoscopic video observation device 200. Alternatively, the switching section 218 may be realized by using a software switch under control of basic software that controls the operation of the stereoscopic video observation device 200 in a centralized manner. In either case, the stereoscopic video observation device 200 makes a transition between two states, that is, a non-transmission allowing state and a non-transmission prohibiting state according to the setting of the switching section 218.

Figure 6:
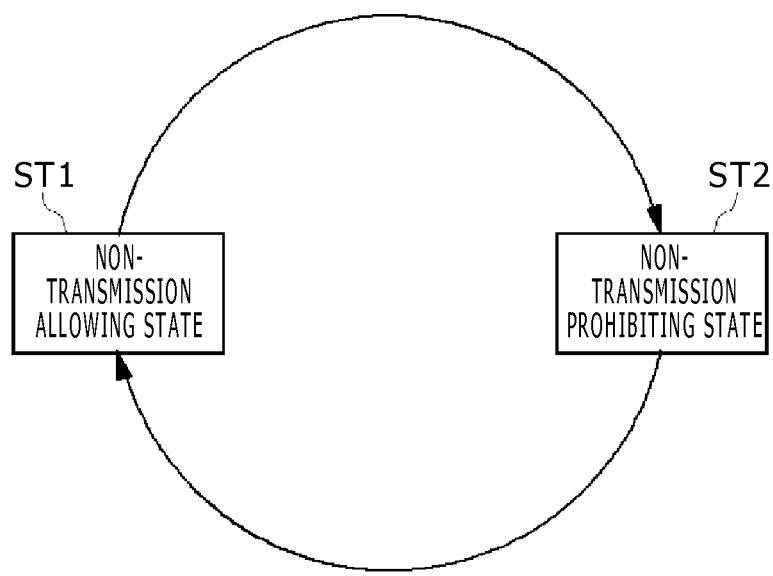
FIG. 6 is a diagram of state transitions of the stereoscopic video observation device according to the embodiment.

FIG. 6 is a diagram of state transitions of the stereoscopic video observation device 200 according to the embodiment. As shown in FIG. 6, when the switching section 218 allows the shutter control section 220 to control the lower limit value of the light transmittance that can be changed by the liquid crystal shutter 210, the stereoscopic video observation device 200 is in a non-transmission allowing state ST1. When the switching section 218 is switched to a side that prohibits the shutter control section 220 from controlling the lower limit value of the light transmittance that can be changed by the liquid crystal shutter 210 while the stereoscopic video observation device 200 is in the non-transmission allowing state ST1, the stereoscopic video observation device 200 makes a transition to a non-transmission prohibiting state ST2. When the switching section 218 allows again the shutter control section 220 to control the lower limit value of the light transmittance that can be changed by the liquid crystal shutter 210 while the stereoscopic video observation device 200 is in the non-transmission prohibiting state ST2, the stereoscopic video observation device 200 makes a transition to the non-transmission allowing state ST1.

As described above, while the stereoscopic video observation device 200 is in the non-transmission allowing state ST1, the external light may be completely shut off by the liquid crystal shutter 210. Accordingly, when the switching section 218 changes the state of the stereoscopic video observation device 200, the notifying information generating section 224 generates a message for notifying the user to that effect in advance, and makes the optically transmissive HMD 208 display the message. After the message generated by the notifying information generating section 224 is displayed on the optically transmissive HMD 208, the shutter control section 220 controls the lower limit value of the transmittance according to the state of the stereoscopic video observation device 200.

Figure 7:
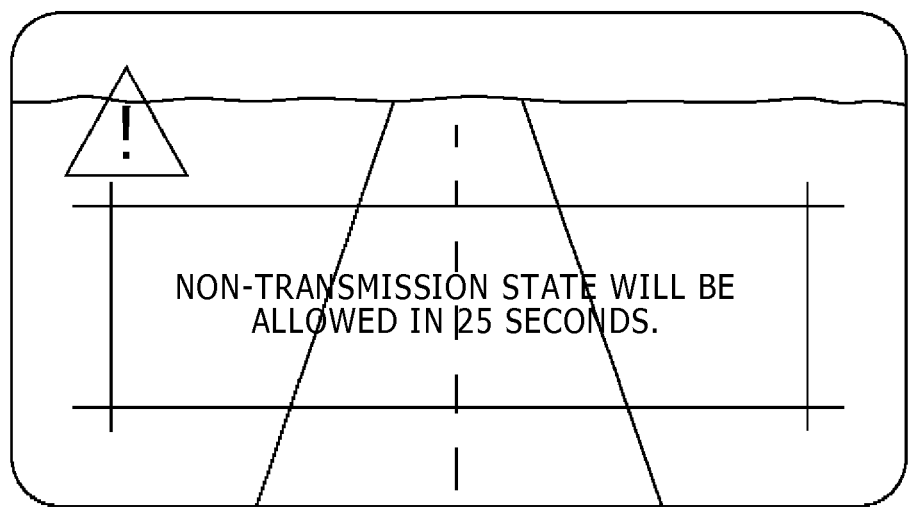
FIG. 7 is a diagram showing another example of a message generated by the notifying information generating section according to the embodiment.

FIG. 7 is a diagram showing another example of the message generated by the notifying information generating section 224 according to the embodiment. As in the case shown in FIG. 5, in order to make the user notice surely, information is displayed in a state of being superimposed on a view actually observed by the user. This allows the user to be prepared for a change in the state of the stereoscopic video observation device 200, and can therefore reduce a sense of unexpectedness caused to the user.

Figure 8:
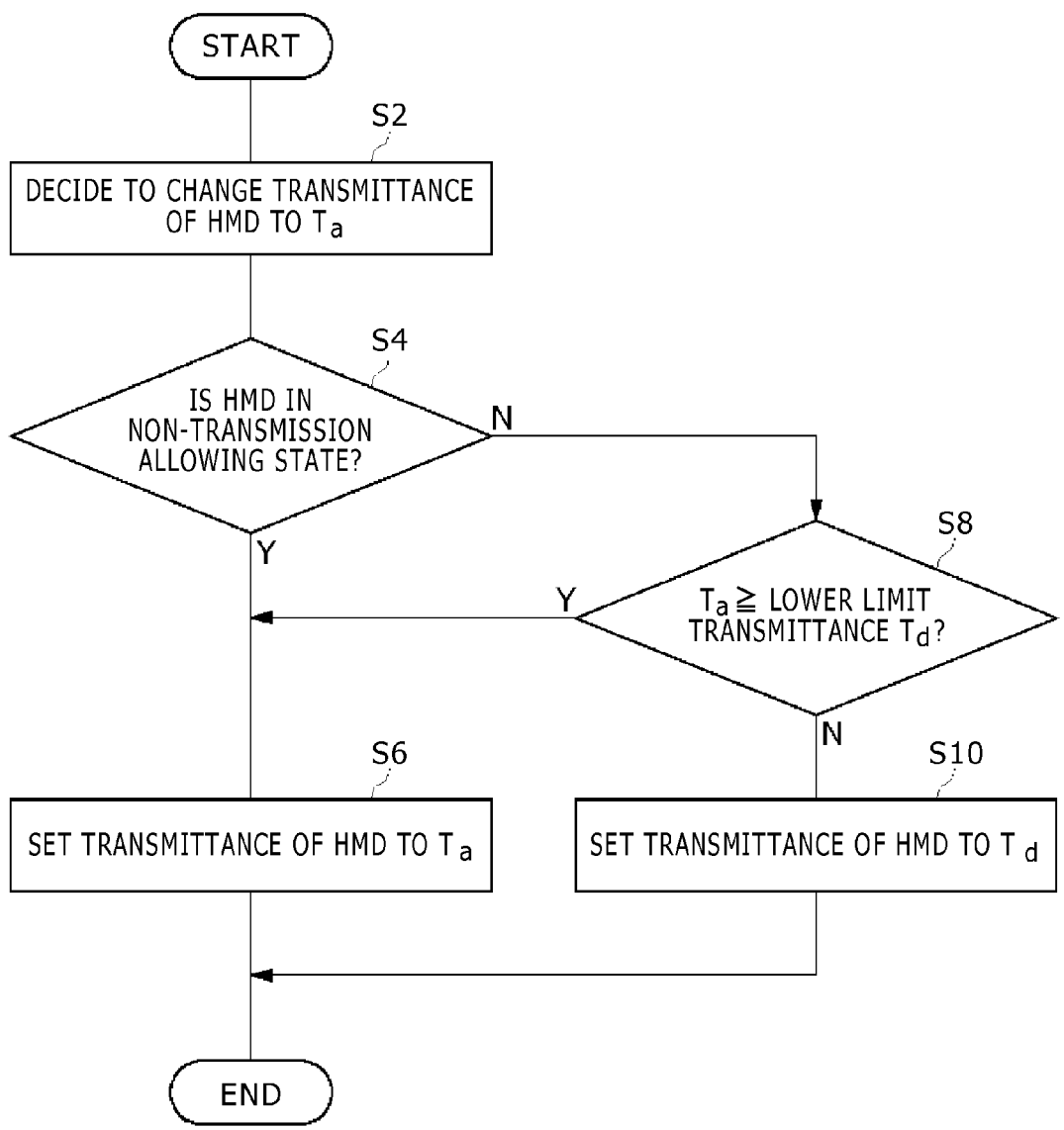
FIG. 8 is a flowchart showing a flow of transmittance control processing by the stereoscopic video observation device according to the embodiment.

FIG. 8 is a flowchart showing a flow of transmittance control processing by the stereoscopic video observation device 200 according to the embodiment. The processing in the present flowchart is started when power to the stereoscopic video observation device 200 is turned on, for example.

The shutter control section 220 decides to change, to $T_a$, the transmittance of the external light transmitted by the liquid crystal shutter 210 to the optically transmissive HMD when obtaining a request to set the transmittance to $T_a$ from an application or the like or on the basis of the physical quantities detected by the detecting block 214 (S2). The shutter control section 220 checks whether or not the stereoscopic video observation device 200 is set in the non-transmission allowing state by the switching section 218. When the stereoscopic video observation device 200 is in the non-transmission allowing state (Y in S4), the shutter control section 220 controls the liquid crystal shutter 210 to set the transmittance of the external light transmitted to the optically transmissive HMD to $T_a$ (S6).

When the stereoscopic video observation device 200 is in the non-transmission prohibiting state (N in S4), the shutter control section 220 checks whether or not the determined transmittance $T_a$ is equal to or higher than the lower limit transmittance $T_d$. When $T_a \geq T_d$ (Y in S8), the shutter control section 220 controls the liquid crystal shutter 210 to set the transmittance of the external light transmitted to the optically transmissive HMD to $T_a$ (S6). When $T_a < T_d$ (N in S8), the shutter control section 220 controls the liquid crystal shutter 210 to set the transmittance of the external light transmitted to the optically transmissive HMD to the lower limit transmittance $T_d$ (S10). After the shutter control section 220 sets the transmittance of the external light transmitted to the optically transmissive HMD, the processing in the present flowchart is ended.

The above description has been made of a case where the stereoscopic video observation device 200 according to the embodiment is mainly used singly. As described above, the liquid crystal shutter 210 of the stereoscopic video observation device 200 also functions as an optical shutter for observing a three-dimensional monitor of the frame sequential system. The following description will be made of a case where a three-dimensional monitor of the frame sequential system is observed using the stereoscopic video observation device 200 according to the embodiment.

Figure 9:
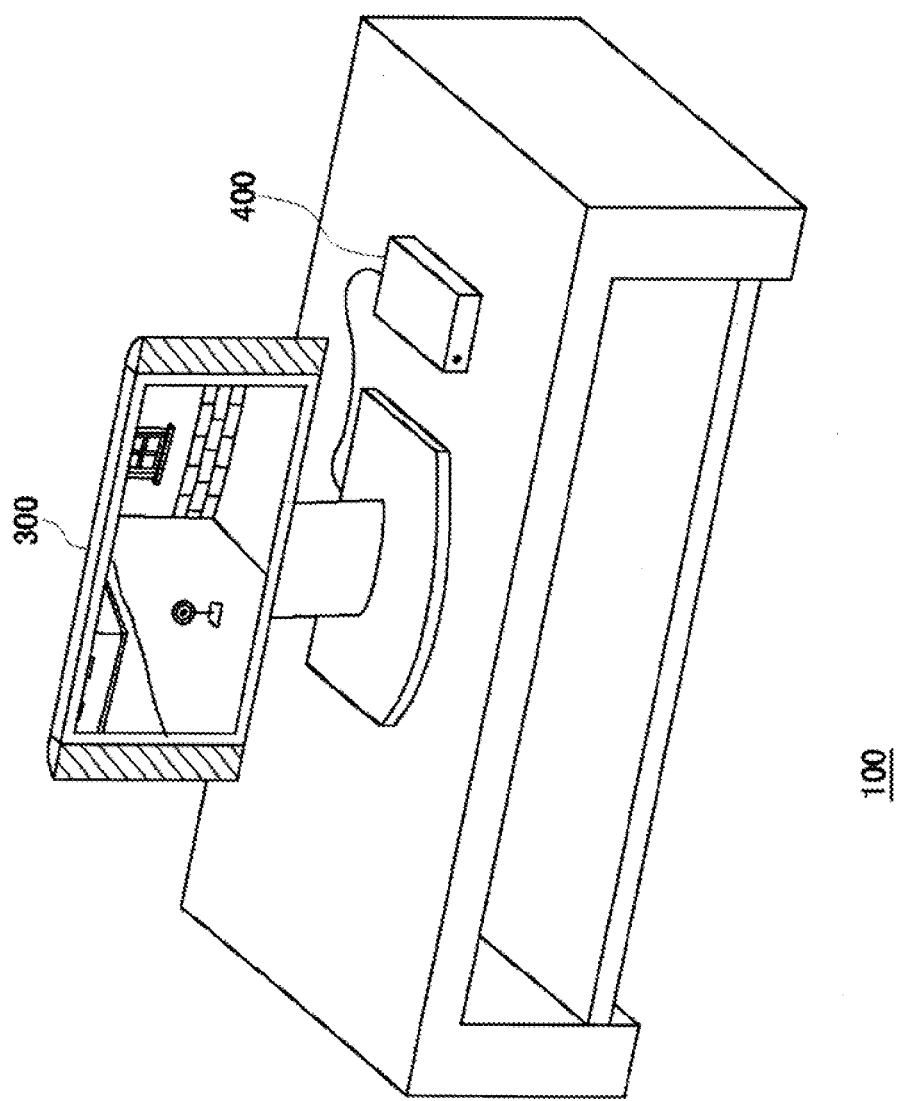
FIG. 9 is a diagram schematically showing a general constitution of a video presenting system according to the embodiment.

FIG. 9 is a diagram schematically showing a general constitution of the video presenting system 100 according to the embodiment. The video presenting system 100 according to the embodiment includes the stereoscopic video observation device 200, the three-dimensional monitor 300, and the information processing device 400.

The three-dimensional monitor 300 displays stereoscopic video by the frame sequential system. The left and right eyes of a human are separated from each other by about 6 cm. A parallax thus occurs between the video seen from the left eye and the video seen from the right eye. The brain of a human is said to use parallax images perceived by the left and right eyes as one piece of information for recognizing a depth. Therefore, when the parallax image perceived by the left eye and the parallax image perceived by the right eye are projected into the respective eyes, the human recognizes the parallax images as video having a depth. The three-dimensional monitor 300 displays the parallax image for the left eye and the parallax image for the right eye alternately on a time-division basis. The three-dimensional monitor 300 can be realized by using a known presenting device such as a liquid crystal television set, a plasma display, an organic EL monitor, or the like.

The liquid crystal shutter 210 opens and closes a left shutter and a right shutter in synchronism with the changing of the parallax images by the three-dimensional monitor 300. More specifically, when the three-dimensional monitor 300 is displaying the parallax image for the left eye, the liquid crystal shutter 210 closes the shutter for the right eye and opens the shutter for the left eye to present the parallax image for the left eye to the user wearing the stereoscopic video observation device 200. Conversely, when the three-dimensional monitor 300 is displaying the parallax image for the right eye, the liquid crystal shutter 210 closes the shutter for the left eye and opens the shutter for the right eye to present the parallax image for the right eye to the user.

In order to realize this, the synchronizing signal receiving section 212 receives a synchronizing signal for shutter switching. The synchronizing signal is transmitted from the signal transmitting section not shown in the figures which signal transmitting section is provided in the three-dimensional monitor 300 or the information processing device 400 by radio for example using infrared light or the like. The shutter control section 220 controls the opening and closing of the liquid crystal shutter 210 according to the synchronizing signal received by the synchronizing signal receiving section 212.

The liquid crystal shutter 210 thus has the two functions, that is, the function of changing the transmittance of external light and the function of an optical shutter for observing a three-dimensional monitor of the frame sequential system. Hence, when the three-dimensional monitor 300 and the optically transmissive HMD 208 are used simultaneously to present three-dimensional video to the user as in the example shown in FIG. 9, the shutter control section 220 controls the operation of the liquid crystal shutter 210 such that the liquid crystal shutter 210 realizes the above-described two functions simultaneously. The control of the liquid crystal shutter 210 by the shutter control section 220 in the case where the above-described two functions are realized simultaneously will be concretely described in the following.

A change in the transmittance of the liquid crystal shutter 210 is realized by using molecules referred to as a liquid crystal. The liquid crystal has a property of changing in angle of polarization according to the magnitude of a voltage applied to the liquid crystal. By controlling this voltage, the angle of polarization of the liquid crystal molecules is controlled, so that an amount of light that passes through the liquid crystal molecules can be controlled. There are two systems, that is, a system in which the transmittance when no voltage is applied to the liquid crystal molecules is 100% and a system in which the transmittance when no voltage is applied to the liquid crystal molecules is 0%. In either case, the transmittance of the liquid crystal shutter 210 can be controlled in a range of 0% to 100% by controlling the magnitude of the voltage applied to the liquid crystal molecules. For example, when a voltage is applied such that the transmittance of the liquid crystal shutter 210 becomes 50%, the amount of light that passes through the liquid crystal shutter 210 at that time becomes 50%, of course. For the convenience of description, a case where the liquid crystal shutter 210 has a transmittance of 0% will hereinafter be described as a state in which "the shutters of the liquid crystal shutter 210 are on." A case where the liquid crystal shutter 210 has a transmittance higher than 0% will hereinafter be described as a state in which the "shutters of the liquid crystal shutter 210 are off" irrespective of the magnitude of the transmittance.

The amount of light that passes through the liquid crystal shutter 210 per unit time can also be controlled by opening and closing the liquid crystal shutter 210 at high speed, that is, alternately changing the transmittance of the liquid crystal shutter 210 to 0% and 100%. For example, when the transmittance of the liquid crystal shutter 210 is changed to 0% and 100% at predetermined intervals (for example intervals of 1/120 of a second), times during which 100% of the light passes through the liquid crystal shutter 210 and times during which the light is completely screened out become equal to each other per unit time. As a result, an amount of light that passes through the liquid crystal shutter 210 per unit time is 50%.

The shutter control section 220 thus changes the light transmittance M by controlling a period $T_{ON}$ during which the transmittance is set at 0% by turning on the shutters of the liquid crystal shutter 210, a period $T_{OFF}$ during which the shutters are turned off, and the angle of polarization of the liquid crystal when the shutters are off.

More specifically, letting M be a transmittance as a setting target, letting $T_{ON}$ be a period during which the shutters of the liquid crystal shutter 210 are turned on, and letting $T_{OFF}$ be a period during which the shutters are turned off, the shutter control section 220 controls the magnitude of the voltage applied to the liquid crystal such that a light transmittance N when the shutters are off satisfies the following Equation (1), and thus controls the angle of polarization of the liquid crystal.

$$N=(T_{ON}+T_{OFF})/T_{OFF} \times M \quad (1)$$

For example, consideration will be given to a case where the shutter control section 220 sets the transmittance M of the liquid crystal shutter 210 at 30%. Here, suppose that the liquid crystal shutter 210 is repeatedly turned on for 1/60 of a second and turned off for 1/120 of a second. That is, $T_{ON}=1/60$, $T_{OFF}=1/120$, and M=0.3. Substituting these values into Equation (1) yields N=(1/60+1/120)/(1/120)×0.3=0.9.

In the present example, $T_{ON}:T_{OFF}=2:1$. Thus, in terms of a unit time, a time during which the light can pass through the liquid crystal shutter 210 is ⅓. Hence, this indicates that the light transmittance when the shutters are off needs to be set at 90% in order to set the transmittance M of the liquid crystal shutter 210 at 30% as a whole.

A usage scene of the stereoscopic video observation device 200 with the above configuration is as follows. When the user wears the stereoscopic video observation device 200 in the non-transmission prohibiting state ST2 and observes video presented by the optically transmissive HMD 208, the shutter control section 220 sets the lower limit value of the amount of light that passes through the liquid crystal shutter 210 according to the physical quantities detected by the detecting block 214. The shutter control section 220 controls the operation of the liquid crystal shutter 210 according to Equation (1) so as to realize the set transmittance actually in a range not lower than the lower limit value of the transmittance set to the liquid crystal shutter 210.

As described above, according to the stereoscopic video observation device 200 according to the embodiment, a technology for improving the usability of the optically transmissive HMD capable of changing the transmittance of light can be provided. In particular, by providing a non-transmission prohibiting state for the optically transmissive HMD, it is possible to reduce annoyance caused to the user which annoyance is caused by a changing request from an application, an erroneous operation in transmittance control, or the like.

The present invention has been described above on the basis of embodiment thereof. The embodiment is illustrative, and it is to be understood by those skilled in the art that combinations of constituent elements and processing processes of the embodiment are susceptible of various modifications and that such modifications also fall within the scope of the present invention.

(First Modification)

The above description has been made of a case where the detecting block 214 includes the illuminance detecting section 230, the motion detecting section 232, and the proximity degree detecting section 234. However, sensors implemented in the detecting block 214 are not limited to these detecting sections. Various other sensors such for example as a temperature sensor, a sound volume sensor, a humidity sensor, and the like may be included according to usage scenes of the stereoscopic video observation device 200.

(Second Modification)

The above description has been made of a case where the switching section 218 can change the stereoscopic video observation device 200 to a non-transmission allowing state and a non-transmission prohibiting state. However, the stereoscopic video observation device 200 is desirably set in the non-transmission prohibiting state at a time of shipment of the stereoscopic video observation device 200. This can reduce annoyance that can be caused to a user who uses the stereoscopic video observation device 200 for the first time, which annoyance may be caused by transmittance control.

REFERENCE SIGNS LIST

100 Video presenting system, 200 Stereoscopic video observation device, 202 Presenting block, 204 First imaging element, 206 Casing, 208 Optically transmissive HMD, 210 Liquid crystal shutter, 212 Synchronizing signal receiving section, 214 Detecting section, 216 Audio output section, 218 Switching section, 220 Shutter control section, 222 Audio obtaining section, 224 Notifying information generating section, 226 Video obtaining section, 228 Detection control section, 230 Illuminance detecting section, 232 Motion detecting section, 234 Proximity degree detecting section, 264 Email reception telop, 300 Three-dimensional monitor, 400 Information processing device.

INDUSTRIAL APPLICABILITY

The present invention is applicable to a stereoscopic video observation device and a transmittance control method performed in the stereoscopic video observation device.

The invention claimed is:

1. A stereoscopic video observation device comprising:
   an optically transmissive HMD configured to present video observed when a three-dimensional image in a virtual three-dimensional space is projected into a real space;
   a transmittance changing section configured to change a transmittance value of light passing through the optically transmissive HMD;
   a shutter control section configured to set a lower limit value of the transmittance value; and
   an illuminance sensor for measuring an ambient light value outside the optically transmissive HMD,
   wherein the transmittance section changes the transmittance value based upon the measured ambient light value.

2. The stereoscopic video observation device according to claim 1, further comprising a motion sensor for detecting a velocity of the stereoscopic video observation device,
   wherein the shutter control section changes the lower limit value of the transmittance value if the motion sensor detects velocity of the stereoscopic video observation device greater than zero.

3. The stereoscopic video observation device according to claim 2,
   wherein the shutter control section adaptively increases the lower limit value as velocity of the stereoscopic video observation device increases.

4. The stereoscopic video observation device according to claim 1, further comprising a switching section configured to make a setting as to whether or not to allow the shutter control section to control the lower limit value of the light transmittance that can be changed by the transmittance changing section.

5. The stereoscopic video observation device according to claim 1, further comprising a notifying information generating section configured to, in a case where the shutter control section changes the transmittance percentage value by a predetermined amount or more, before a setting of the transmittance is changed, present information to an effect that the transmittance will be changed to the optically transmissive HMD.

6. The stereoscopic video observation device according to claim 1,
   wherein the transmittance changing section changing the transmittance of the light passing through the optically transmissive HIVID is a liquid crystal shutter for observing a three-dimensional monitor of a frame sequential system, and
   the shutter control section changes the light transmittance by controlling a period during which the transmittance is set at 0% by turning on the shutter of the transmittance changing section, a period during which the transmittance is set at 100% by turning off the shutter, and an angle of polarization of a liquid crystal when the shutter is off.

7. The stereoscopic video observation device according to claim 6,
wherein letting $T_{ON}$ be a period during which the shutter of the transmittance changing section is turned on, letting $T_{OFF}$ be a period during which the shutter of the transmittance changing section is turned off, and letting M be a transmittance as a setting target of the transmittance changing section, the shutter control section controls the angle of polarization of the liquid crystal so that a light transmittance N when the shutter of the transmittance changing section is off is $N=(T_{ON}+T_{OFF})/T_{OFF} \times M$.

8. A transmittance control method for a processor, comprising:
obtaining a velocity of an optically transmissive HMD for presenting video observed when a three-dimensional image in a virtual three-dimensional space is projected into a real space,
wherein the velocity is obtained from a motion sensor; and
adaptively adjusting a lower limit value of transmittance of light passing through the optically transmissive HMD by controlling a transmittance changing section provided to the optically transmissive HMD on a basis of the velocity.

9. A program for a computer, comprising:
obtaining a velocity of an optically transmissive HMD for presenting video observed when a three-dimensional image in a virtual three-dimensional space is projected into a real space,
wherein the velocity is obtained from a motion sensor; and
adaptively adjusting a lower limit value of transmittance of light passing through the optically transmissive HMD by controlling a transmittance changing section provided to the optically transmissive HMD on a basis of the velocity.

* * * * *